P. O. PROBASCO.
AUTO RIM TOOL.
APPLICATION FILED DEC. 7, 1917.
1,344,562.
Patented June 22, 1920.
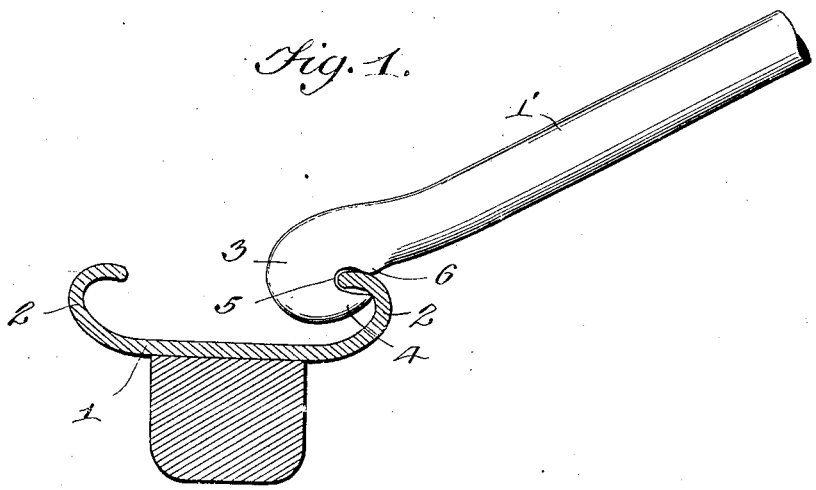
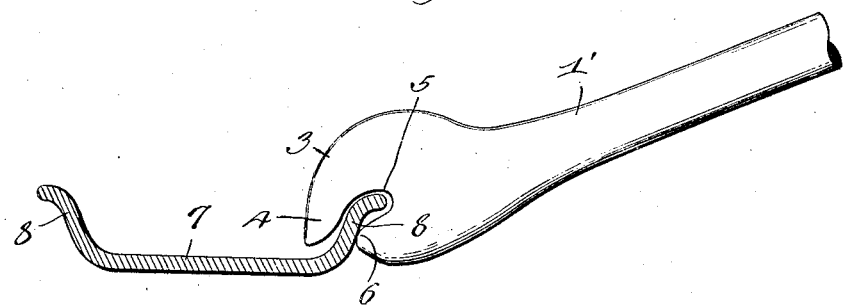
Witnesses
Inventor
P. O. Probasco,
By Victor J. Evans
Attorney

UNITED STATES PATENT OFFICE.

PURLEY O. PROBASCO, OF BUHL, IDAHO.

AUTO-RIM TOOL.

1,344,562.  Specification of Letters Patent.  Patented June 22, 1920.

Application filed December 7, 1917. Serial No. 206,079.

*To all whom it may concern:*

Be it known that I, PURLEY O. PROBASCO, a citizen of the United States, residing at Buhl, in the county of Twin Falls and State of Idaho, have invented new and useful Improvements in Auto-Rim Tools, of which the following is a specification.

This invention relates to vehicle wheel rim flange tools, the object in view being to produce a highly useful tool capable of easy and quick manipulation by means of which a demountable rim may be repaired by bending the flange or flanges thereof back to their normal positions after they have been distorted in any way.

It frequently happens that in operating a motor vehicle on a flat tire, the weight of the vehicle imposed upon the rim is subjected to shocks as by meeting obstructions, and the flanges become bent so that they are apt to seriously injure a tire when mounted upon the rim. This is true with either of the two types of rims now in use, the clencher rim and the straight sided rim.

With the above and other objects in view, the invention consists in the novel construction, combination and arrangement of parts, herein fully described, illustrated and claimed.

In the accompanying drawing:—

Figure 1 is a sectional view of a vehicle wheel rim, showing the improved tool in its relation to one of the flanges thereof.

Fig. 2 is a similar view showing a modified tool in connection with a rim of another type.

In Fig. 1, I have shown the tool as adapted to a vehicle rim 1 having clencher flanges 2 for use in conjunction with the ordinary clencher tire. The tool comprises a body 1' of any suitable length to give the required leverage. The end of the body 1 is bent or curved in the form of a hook 3 and terminates in a pointed bill or tongue 4. A curved slot 5 is thus formed between the body 1 and the bill or tongue 4. Adjacent to the entrance to the slot 5, the body 1 is formed with a rounded bulge 6 forming a fulcrum upon which the tool may be rocked, the bulge or projection 6 resting in contact with the adjacent part of the flange of the rim. By pressing the body 1 toward the hub of the wheel, the flange 2 is opened or spread to the necessary extent, returning the same to its normal position.

In Fig. 2, I have shown the application of the same principle to a straight sided rim 7 having the usual tire holding flanges 8. The tool still comprises the body 1'', the curved portion 3', the bill 4', the curved slot 5' and the bulge or projection 6' which bears against the flange as the body 1'' is moved toward the hub of the wheel.

Under either arrangement, the flanges of vehicle wheel rims may be bent back to their normal curvature so as to properly receive a pneumatic or other tire without liability of injury to the tire.

I claim:—

A tool for bending the flanges of vehicle wheel rims and restoring same to their normal shape said tool comprising a body of suitable length to be operated as a lever a curved head portion at one end of said body, a rim engaging bill having a rounded outer face which curves continuously to the extreme point of the bill, a curved portion of the tool embodying a curved flange receiving slot, and a rounded integral portion directly opposite the point of the bill that is adapted to provide a fulcrum adjustable with respect to the work held in the work holding slot, to meet the requirements of a change in the application of the tool to the work, in reshaping the flange.

In testimony whereof I affix my signature.

PURLEY O. PROBASCO.